No. 638,402. Patented Dec. 5, 1899.
E. ROSS.
DRINKING FOUNTAIN FOR FOWLS.
(Application filed Apr. 4, 1899.)

(No Model.)

Witnesses
Howard D. Orr.

E. Ross, Inventor
By his Attorneys,
C. A. Snow & Co.

UNITED STATES PATENT OFFICE.

EBENEZER ROSS, OF TOLEDO, OHIO.

DRINKING-FOUNTAIN FOR FOWLS.

SPECIFICATION forming part of Letters Patent No. 638,402, dated December 5, 1899.

Application filed April 4, 1899. Serial No. 711,693. (No model.)

*To all whom it may concern:*

Be it known that I, EBENEZER ROSS, a citizen of the United States, residing at Toledo, in the county of Lucas and State of Ohio, have invented a new and useful Drinking-Fountain for Fowls, of which the following is a specification.

My invention relates to a drinking-fountain for fowls, and has for its object to provide a combined drinking-fountain, wherein the cup may be readily disconnected for cleansing purposes, and tempering device, whereby a hen house or inclosure may be maintained at a moderate temperature while the water supplied to the drinking-cup is at a suitable temperature for drinking purposes, it being well known that fowls, except under compulsion, will not drink warm water, and, furthermore, to provide means whereby the reservoir which constitutes the radiating-drum may be filled without removal from the heating device.

Further objects and advantages of this invention will appear in the following description, and the novel features thereof will be particularly pointed out in the appended claim.

Figure 1:
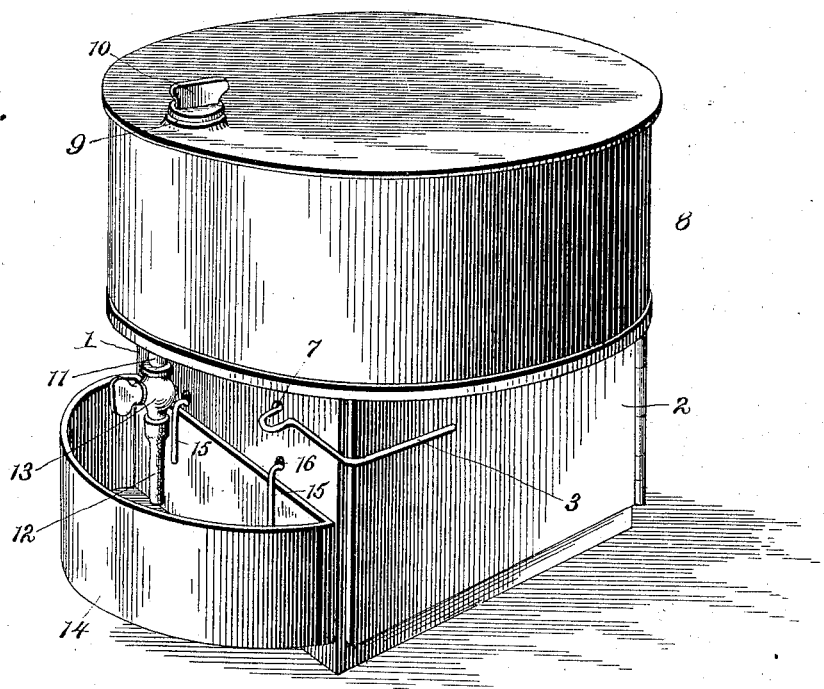
Figure 2:
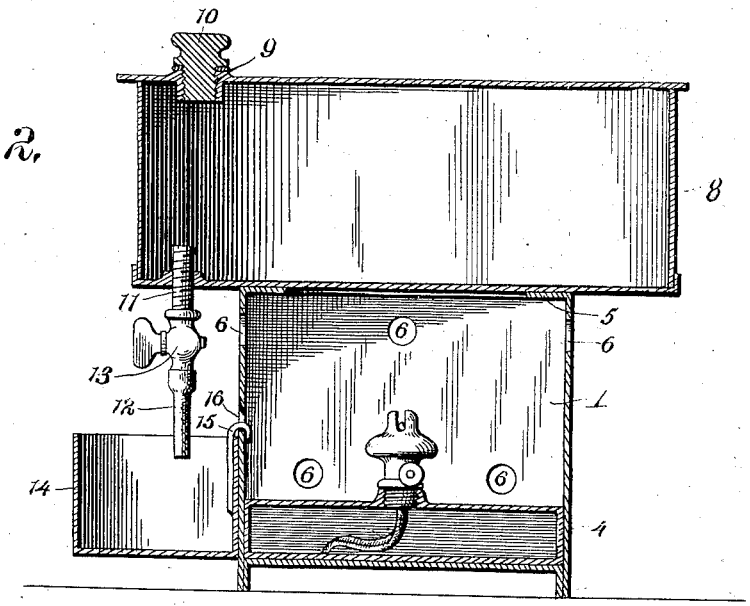

In the drawings, Figure 1 is a perspective view of a watering-fountain constructed in accordance with my invention. Fig. 2 is a vertical central section of the same.

Similar reference characters indicate corresponding parts in both figures of the drawings.

1 designates an open-topped heating-chamber, of which one of the walls is constructed to form a swinging door 2, having a latch 3, and 4 designates a heating device, such as a lamp, arranged within the heating-chamber, the upper edges of the walls of the latter being inturned to form ledges 5. The walls of the heating-chamber are also provided with ventilating-openings 6 and a suitable perforation 7 for engagement by said door-latch 3. The free end of the latch is bent at right angles to the door, and the tip is preferably given a half-turn outwardly to form a semicircular finger-hold for withdrawing it from the perforation 7 to open the door. The top of the heating-chamber is closed by a reservoir 8, preferably of cylindrical construction, which is disconnected from the heating-chamber and is adapted to be removed, said reservoir constituting a heating-drum, in which the contained water is raised to a heating temperature by the lamp, to temper the air of the hen-house. This reservoir, which is otherwise closed at its top, is provided with a supply-opening 9, fitted with an air-tight removable filling-plug 10, and depending from the bottom of the reservoir, which overhangs the side walls of the heating-chamber, is a feed-tube 11, preferably having a flexible tip 12 of rubber hose or the equivalent thereof and fitted with a cock or cut-off valve 13. The upper end of the feed-tube 11 projects slightly above the bottom of the reservoir, so that the water will never be entirely out of the reservoir, thus avoiding the possibility of its getting dry and being damaged by the heat from the lamp. Also in connection with the apparatus is arranged a drinking-cup 14, having a flat vertical inner wall provided at its upper edge with hangers or suspending-hooks 15 for engagement with sockets 16, consisting of perforations in the adjacent wall of the heating-chamber. The perforations 16 and 3 are so much larger than the hooks and the latch that air will pass through them, and thus assist in ventilating the heating-chamber. It will be seen that this drinking-cup, being detachable from the other elements of the apparatus, is adapted to be cleansed readily when necessary, and the flexibility of the tip, which is employed at the lower end of the feed-tube, provides for displacing said cup, the tip, which extends at its lower end below the plane of the upper edge of the cup, being adapted to yield as the cup is displaced. The lower extremity of the tip is designed to dip into the contents of the cup to form a water seal, whereby when the cock or valve is open the water is fed to the cup only as fast as it is consumed or as the surface thereof is lowered by evaporation.

It is well known that to maintain the interior of a hen-house at a moderate temperature increases the egg production and that by an apparatus as hereinbefore described I am enabled to utilize the same for thus tempering the air and supplying the fowls with drinking-water. The heating device maintains the reservoir or drum at a temperature sufficiently high to operate efficiently in the capacity of a heater, whereas the heat is not communicated objectionably to the contents of the drinking-cup, and therefore the water in the latter is maintained at a sufficiently low temperature to be palatable to the fowls. The arrangement of the parts is such that there is no circulation and communication of heat from the reservoir to the drinking-cup, and the water in the feed-tube is at a much lower temperature, being exposed to the outside air, than is the water in the drum. The reason for the cooler temperature of the contents of the feed-tube is that the latter is arranged outside of the heating-chamber and depends directly from the floor of the reservoir to the interior of the drinking-cup. Thus when the contents of the drinking-cup have been consumed sufficiently to reduce the surface thereof to expose the lower end of the feed-tube the water in the feed-tube will flow into the drinking-cup to supply the deficiency and again raise the surface of the water in the latter to seal the feed-tube, while the feed-tube will be filled by water from the interior of the reservoir. This fresh supply of water in the feed-tube, however, has time to cool before the surface of the water in the drinking-cup is again reduced, and as a result the water in the drinking-cup is at a much lower temperature than that which is in the reservoir.

Although the contents of the drinking-cup are not heated sufficiently to become unpalatable to the fowls, the effect of the proximity of the heating device is such as to prevent freezing, and hence the contents of the drinking-cup are maintained in a proper condition even during severe weather and the air in the hen-house is moderated sufficiently to increase the production of the hens.

In practice various changes in the form, proportion, size, and minor details of construction within the scope of the appended claim may be resorted to without departing from the spirit or sacrificing any of the advantages of the invention.

Having described my invention, what I claim is—

In a drinking-fountain for fowls the combination, with an open-topped heating-drum, one side of which forms a door and the remaining sides are provided with perforations, and one of the sides is provided with more perforations than the others, of a latch projecting from one edge of the door and at right angles thereto, the tip of the latch fitting within one of the perforations and having a semicircular finger-hold formed thereon, a lamp within the chamber, a reservoir upon the top of the chamber, a portion of which overhangs the side of the chamber provided with the extra perforations, the top of the reservoir being provided with an air-tight plug, a drinking-cup provided with hooks upon one side, said hooks entering a portion of the extra openings in the side of the chamber, said openings being larger than the end of the hooks and of the latch respectively, and a feed-tube between the overhanging portion of the reservoir and the drinking-cup, the upper end of which is secured to and projects above the bottom of the reservoir and the lower end projects below the top of the cup and the intermediate portion is provided with a stop-cock.

In testimony that I claim the foregoing as my own I have hereto affixed my signature in the presence of two witnesses.

EBENEZER ROSS.

Witnesses:
NORAH ASHBACKER,
HENRY KING.